Feb. 12, 1952  R. A. PYLE  2,585,171
CARBURETOR

Filed April 14, 1950  2 SHEETS—SHEET 1

Robert A. Pyle
INVENTOR.

BY
Attorneys

Feb. 12, 1952  R. A. PYLE  2,585,171
CARBURETOR
Filed April 14, 1950  2 SHEETS—SHEET 2

Robert A. Pyle
INVENTOR.

BY *Clarence A. O'Brien
and Harvey B. Jacobson*
Attorneys

Patented Feb. 12, 1952

2,585,171

UNITED STATES PATENT OFFICE 2,585,171

CARBURETOR

Robert A. Pyle, Lapeer, Mich.

Application April 14, 1950, Serial No. 155,857

9 Claims. (Cl. 123—133)

This invention relates to improvements in charge forming devices.

An object of this invention is to provide an improved charge forming device adapted to be used in connection with a conventional internal combustion engine, the function of the charge forming device being to supply starting fuel in the intake manifold or intake manifold riser while the engine is under starting conditions and to cut this fuel supply off and supply heated, vaporized fuel, after the starting or priming fuel has been stopped.

A further object of this invention is to controllably regulate the valve for metering the fuel in response to an adjustable spring load and also the suction in the riser or intake manifold.

A still further object of the invention is to provide a vaporizing unit which is operatively connected with the exhaust manifold of the engine whereby fuel flowing through the main fuel jet is deposited therein for vaporization due to the heat of the exhaust manifold and whereby the pressure so built up causes operation of the valve core for further regulation of the fuel flow and whereby the fuel, thus vaporized, may be delivered to a communicating vaporization chamber, to the riser of the intake manifold.

It is a further object of this invention to controllably regulate the size of a restriction forming means in the communicating chamber, the regulation of the restriction forming means being responsive to the suction in the riser upstream of the throttle valve and also opposed by an adjustable spring load.

Other objects and features will become apparent in following the description of the illustrated form of the invention.

Figure 1:
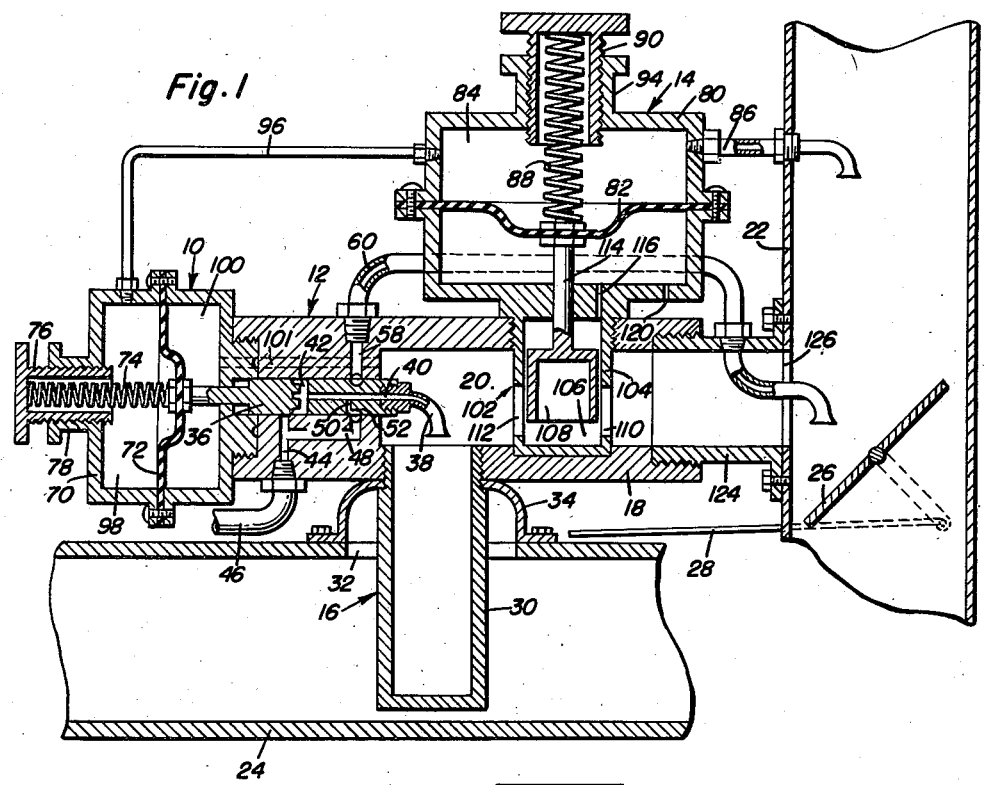
Figure 1 is a fragmentary sectional view of parts of an engine and a sectional view of the charge forming device, the elements being arranged for starting the engine operation when the engine is in a cold condition.

The method of introducing fuel to an ordinary internal combustion engine through the medium of a conventional carburetor is well known. In contradistinction to what is normally employed today as conventional equipment of an engine, there is provided a charge forming device which supplies raw fuel to a vaporizer unit, the raw fuel depending on the heat of the vaporizer unit, taken from the exhaust manifold of the engine, to vaporize this fuel for subsequent delivery into the intake manifold or intake manifold riser. By this medium the delivery of fuel to the throat of the intake manifold or to the riser thereof, is such that raw fuel is not delivered thereto and subsequently broken down into a mist, but rather, is delivered in a gaseous state. The illustrated form of the device is one having practical application on certain types of manufactured engines found in various manufacturers make automobiles. Minor mechanical rearrangement is necessary to adapt the device for use with other standard make engines.

The device consists of certain assemblies which are structurally and functionally connected to perform the desired operation. There is a pressure regulator 10 operatively connected with a metering valve 12. There is a fuel regulator 14, a vaporizer unit 16 and a tubular member 18 forming a fuel chamber 20 connecting the riser 22 or upper part of the intake manifold with the vaporizer unit. These assemblies, generally indicated, are the essential parts in the make-up of the device. Also, of necessity included in combination with the assemblies, is the exhaust manifold 24, the throttle or throttle valve 26 pivoted in the riser 22 and the operating linkage 28 therefor.

In the illustrated instance, the vaporizer unit consists of a tube 30 which is passed through an opening 32 in the exhaust manifold 24. A coupling 34 is secured to the exhaust manifold 24 and threaded or otherwise rigidly fixed to the upper end of the tube 30. The tube 30 is secured to said member or tube 18 and opens into the chamber 20. At one end of the member 18 the core 36 of the valve 12 is slidably operable in a valve chamber. The core has a fuel jet 38 aligned with the axial fuel passage 40 therein to deliver the main fuel supply. A connecting passage 42 is formed in the core 36 and is adapted to communicate with the passage 44 which is formed in one end of the member 18 and is in communication with the conduit 46. The conduit 46 extends from the fuel pump of the engine to deliver fuel into and through the metering valve by passing through the passages 44, 42 and 40.

A branch passage 48 joins with the passage 44 and opens into the valve chamber for communication with the metering restriction or orifice 50 branching from the axial passage 40.

Accordingly, when the core 36 is in the position disclosed in Figure 1, which is the engine cold starting position, the fuel passes through the branch passage 48, through the annular groove 52 on the exterior of the core 36 and finally through the passage 58 in the member 18 for subsequent delivery through the pipe 60 which opens into the riser 22 up-stream of the throttle valve 26. In the condition of elements shown in Figure 1, a portion of the fuel will pass through the restricted passage or orifice 50, thence through the axial passage 40 for delivery through the main fuel jet 38 and deposit in the vaporizing unit tube 30.

The pressure regulator consists of a housing 70 having a diaphragm 72 therein. The core 36 is secured to the diaphragm 72 so that operation of the diaphragm causes operation of the core 36 of the valve 12. On the other side of the diaphragm there is a calibrated spring 74, one end of which rests on the axially adjustable cap 76. This axially adjustable cap is threaded in a boss 78 which is either rigidly fixed to the housing 70 or which is formed integral therewith. By adjustment of the cap 76, the effective force of the spring, which opposes the operation of the diaphragm 72, is obtained. It is noted at this point that in lieu of the diaphragm 72, a piston-cylinder assembly may be supplied.

The fuel regulator 14 is constructed much the same as the pressure regulator 10. There is a housing 80 provided with a flexible diaphragm 82 separating the housing into an upper and lower chamber. The upper chamber 84 is a suction chamber inasmuch as the small length of conduit 86 opens thereinto and also into the riser 22, forming a means of connecting the riser with the suction chamber of the fuel regulator for operation of the diaphragm 82 in response to the suction in the riser or intake manifold up-stream of the throttle valve 26.

A calibrated spring 88 is secured to one surface of the diaphragm 82, or the piston if a piston-cylinder assembly is desired in lieu of the diaphragm assembly, and has the other end seated on the adjustable cap 90. This adjustable cap is threaded in a boss 94 which forms a part of, or which is rigidly secured to the housing 80. By manual adjustment of the cap 90, the efficacy of the spring, which opposes the flexure of the diaphragm 82 may be regulated.

A length of conduit 96 opens into the suction chamber 84 at one end and into the chamber 98 of the housing 70 at the other end. This balances the suction which is taken from the riser 22 between the fuel regulator and the pressure regulator. The chamber 100 of the pressure regulator, which is separated from the chamber 98 by the diaphragm 72, is a pressure chamber inasmuch as the passage 102 extending through one end of the member 18, connects the chamber 100 with the fuel vaporizing chamber 20. When the fuel delivered from the downwardly opening nozzle at the end of the jet 38 is disposed in the vaporizer unit and sufficient heat in the exhaust manifold causes this fuel to vaporize, a pressure is built up in the chamber 20 and in the vaporizer unit. Inasmuch as the chamber 100 is in direct communication with this pressure, the pressure causes the diaphragm 12 to be flexed thereby moving the valve core 36 with it.

Forming an operative part of the fuel regulator is a means of forming a restriction in the chamber 20. This means consists of a valve assembly 102. The valve assembly is a sleeve 104 forming a valve chamber 106 with the valve core 108 operable therein. Aligned openings 110 and 112 in the side walls of the sleeve 104 are adapted to be opened and closed upon operation of the valve core or member 108. The shank 114 extending from the valve member 108 is fixed to the diaphragm 82 by usual means so that upon operation of the diaphragm 82, as influenced and occasioned by the suction in the riser 22 opposed by the spring 88, the valve member 108 is raised or lowered. A bleeder passage 116 communicates the valve chamber 106 with the lower chamber of the housing 80 so as not to interfere with the free operation of the diaphragm 82. Moreover, the pressure in the chamber 20 is permitted to impart the pressure present in the lower chamber of the housing 80. An atmospheric vent 120 is supplied in the housing 80 serving its usual function.

It was noted that the conduit or pipe 60 opens into the riser 22. However, in so doing it passes through the side wall of the flanged extension 124 connecting the main body of the member 18 with the riser 22 and in communication with the opening 126 in said riser.

In operation, reference is made first to Figure 1. With the vaporizer unit cold and no pressure in the chamber 20 the spring 74 urges the diaphragm 72 to retain the valve core 36 in the position disclosed. At this time a small amount of fuel is capable of passing through the restricted passage 50 and consequently through the main fuel jet 38 and into the vaporizer unit 16. The majority of the fuel, however, will pass through the passage 58 and the conduit 60 for disposition up-stream of the throttle valve 26 in the riser 22. With the throttle in the position disclosed in Figure 1, the fuel will be drawn rather forcefully into the engine inasmuch as there will be high velocity air flow on the sides of the throttle valve 26. Hence, the engine is capable of being started.

Figure 2:
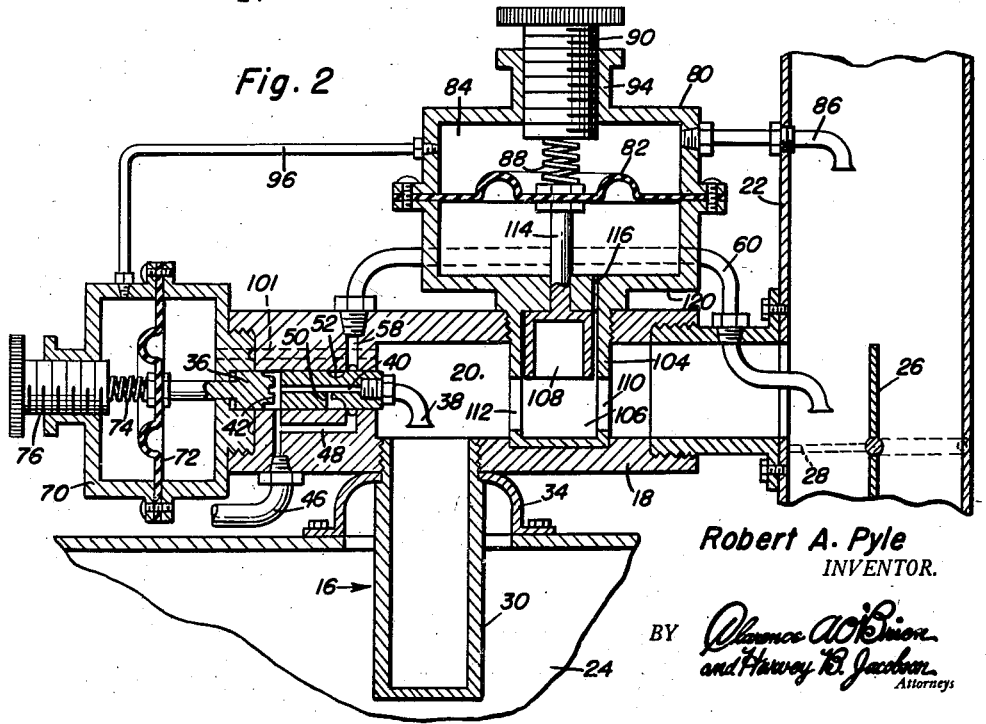
Figure 2 is a fragmentary view similar to that in Figure 1, the arrangement of the charge forming device being such as to deliver a full or capacity supply of fuel to the intake manifold or riser.
Figure 3:
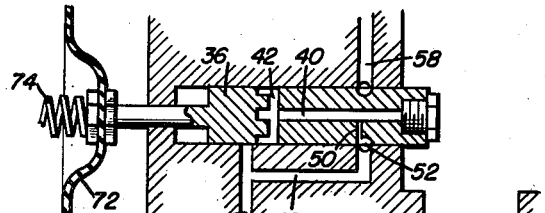
Figure 3 is a schematic view showing the condition of the metering valve and a part of the pressure regulator at the cold starting condition.

As soon as the engine has started, it is wise and economical to stop the flow of the starting fuel. Accordingly, suction in the chamber 84 is delivered by way of the conduit 96 to the chamber 98 to assist in overcoming the opposing force of the spring 74. There will be the raw fuel in the bottom of the vaporizer unit (Figure 3) at this time. As soon as this fuel in the vaporizer unit begins to evaporate, pressure in the chamber 20 is built up because the restriction forming means 102 substantially closes the communication of the vaporizer unit with the riser 22. The fuel disclosed in Figure 3, vaporizing causes pressure to be built up in the chamber 20, this pressure reacting on the diaphragm 72 through the passage 101. Accordingly, the diaphragm 72 is flexed against the opposing force of the spring 14 thereby pulling the valve core 36 to the position disclosed in Figure 4, that is, the position for warm-up period of the engine. At this time, the suction in the chamber 84 is such to move the diaphragm 82 to the position shown in Figure 2.

Figure 4:
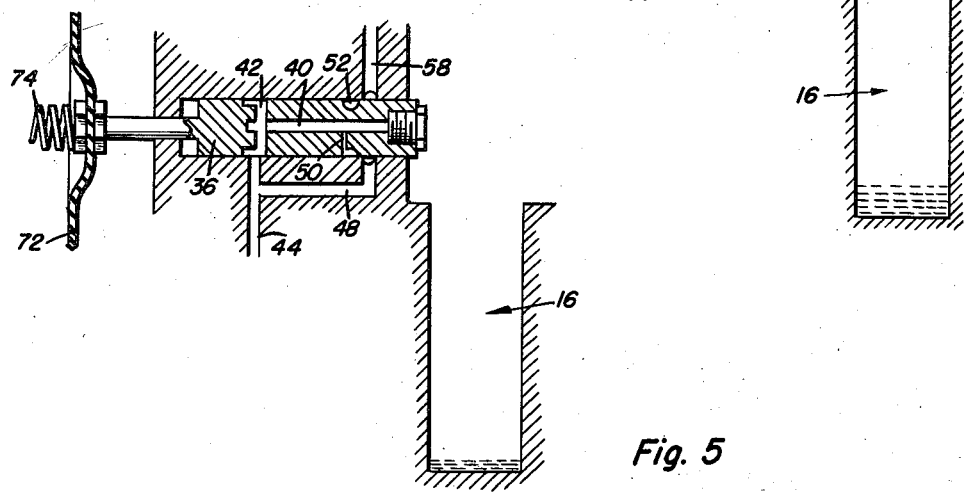
Figure 4 is a schematic view showing the arrangement of elements while the engine is becoming warm.

It will be noted that upon the initial moving of the core 36 as disclosed in Figure 4, the groove 52 is no longer in communication with the branch passage 48, whereby the starting fuel does not flow.

Figure 5:
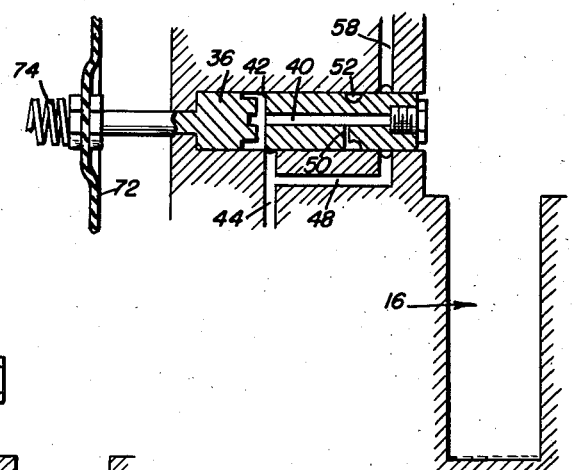
Figure 5 is a schematic view showing the arrangement with the engine hot but there being excessive fuel remaining in the vaporizer unit.

When the engine becomes hot and is ready for proper operation there may be some residual fuel in the bottom of the vaporizer unit tube 30 (Figure 5). The excessive evaporation of this residual fuel will cause too great a pressure in the chamber 20 thereby through the action of the diaphragm 72, cause the valve 36 to move to the condition disclosed in Figure 5 whereby the passage 42 is very nearly cut off from communication with the passage 44. A very small amount of fuel will then be delivered through the passage 40. If desired, the communication between the passages 42 and 44 may be cut off entirely until such time that all of the fuel is used from the tube 30.

At that time the fuel in the vaporizer unit has been exhausted whereby no excessive pressure due to the vaporization of this fuel will be present to cause the extreme operation of the valve core as disclosed in Figure 5.

Figure 6:
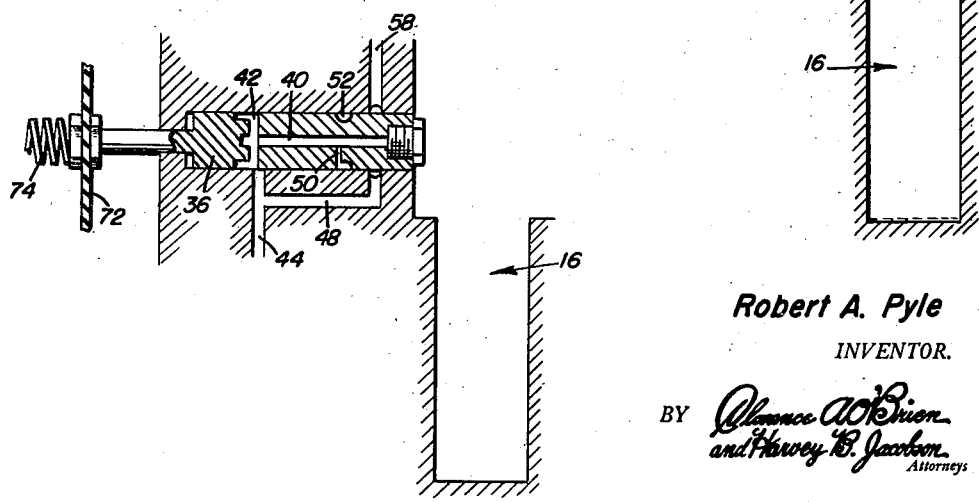
Figure 6 is a schematic view with all of the fuel in the vaporizer unit removed due to heat caused evaporation and the charge forming device being in the normal operative condition.

The final step is disclosed in Figure 6. It is noted that there is no fuel in the vaporizer unit 16 and that the pressure in the chamber 20 is such to retain the valve core 36 in the illustrated condition for proper and exact passage of fuel into the chamber 20 for subsequent delivery into the riser 22.

Having described the invention, what is claimed as new is:

1. In an internal combustion engine which has an exhaust manifold and an intake manifold a charge forming device comprising a fuel metering valve and a fuel regulator, a vaporizing unit operatively connected with said exhaust manifold and arranged in communication with and to receive fuel from said metering valve, a fuel chamber communicating the intake manifold with said vaporizer unit, said fuel regulator arranged to control the flow through said chamber, and means responsive to pressure in said unit for actuating said metering valve.

2. In an internal combustion engine which has an exhaust manifold and an intake manifold a charge forming device comprising a fuel metering valve and a fuel regulator, a vaporizing unit operatively connected with said exhaust manifold and arranged in communication with and to receive fuel from said metering valve, a fuel chamber communicating the intake manifold with said vaporizer unit, said fuel regulator arranged to control the flow through said chamber, means operable in response to pressure in said vaporizing unit for actuating said metering valve, and means connecting said fuel regulator with the intake manifold for intake manifold suction operation of said fuel regulator.

3. The combination of claim 2 and a conduit secured to said fuel regulator and said pressure responsive means for balancing the vacuum to operate said fuel regulator with said pressure responsive means, and the vacuum in the pressure responsive means being operable in opposition of the pressure actuation of the foregoing means.

4. In an internal combustion engine which has an exhaust manifold and an intake manifold a charge forming device comprising a fuel metering valve and a fuel regulator, a vaporizing unit operatively connected with said exhaust manifold and arranged in communication with and to receive fuel from said metering valve, a fuel chamber communicating the intake manifold with said vaporizer unit, said fuel regulator arranged to control the flow through said chamber, means operable in response to pressure in said vaporizing unit for actuating said metering valve, and means connecting said fuel regulator with the intake manifold for intake manifold suction operation of said fuel regulator, said metering valve having a restricted passage therein, a pipe secured to said valve and arranged to receive fuel from the valve when said valve is closed for feeding fuel into said unit, and said pipe opening into the intake manifold to supply starting fuel.

5. In an internal combustion engine having an exhaust manifold and an intake manifold riser with a throttle operable therein, a charge forming device comprising a raw fuel inlet line, a valve with said line connected to feed through said valve, a pipe extending from said valve and secured to the manifold riser to conduct starting fuel to the riser depending on and controlled by the setting of said valve, a main fuel jet operatively connected with said valve, a vaporizer unit operatively connected with the exhaust manifold and having said jet opening thereinto, means connecting said vaporizer unit for flow with the riser, and a regulator connected for valve operation with said valve and operable in response to the pressure in said unit.

6. In an internal combustion engine having an exhaust manifold and an intake manifold riser with a throttle operable therein, a charge forming device comprising a raw fuel inlet line, a valve with said line connected to feed through said valve, a pipe extending from said valve and secured to the manifold riser to conduct starting fuel to the riser depending on and controlled by the setting of said valve, a main fuel jet operatively connected with said valve, a vaporizer unit operatively connected with the exhaust manifold and having said jet opening thereinto, means connecting said vaporizer unit for flow with the riser, a regulator connected for valve operation with said valve and operable in response to the pressure in said unit, and means operatively connected with said regulator for opposing the pressure caused actuation of said regulator.

7. In an internal combustion engine having an exhaust manifold and an intake manifold riser with a throttle operable therein, a charge forming device comprising a raw fuel inlet line, a valve with said line connected to feed through said valve, a pipe extending from said valve and secured to the manifold riser to conduct starting fuel to the riser depending on and controlled by the setting of said valve, a main fuel jet operatively connected with said valve, a vaporizer unit operatively connected with the exhaust manifold and having said jet opening thereinto, means connecting said vaporizer unit for flow with the riser, a regulator connected for valve operation with said valve and operable in response to the pressure in said unit, means operatively connected with said regulator for opposing the pressure caused actuation of said regulator, and means operable in response to the suction in the riser forming a restriction in said means which connects said vaporizer unit for flow with the riser.

8. The combination of claim 5 and said pipe opening into the riser upstream of the throttle.

9. The combination of claim 7 and adjustable means opposing the operation of said restriction forming means.

ROBERT A. PYLE.

REFERENCES CITED

The following references are of record in the file of this patent:

UNITED STATES PATENTS

| Number | Name | Date |
|---|---|---|
| 1,684,085 | Crain | Sept. 11, 1928 |

FOREIGN PATENTS

| Number | Country | Date |
|---|---|---|
| 348,431 | Germany | Feb. 9, 1922 |